June 1, 1943. H. J. SCHRADER ET AL 2,320,476
PHASE MEASUREMENT
Filed Sept. 30, 1941
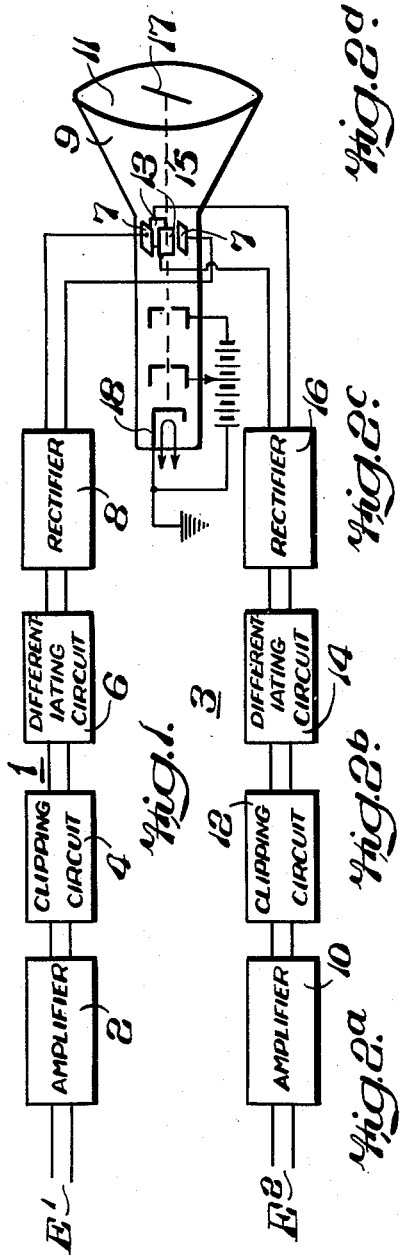
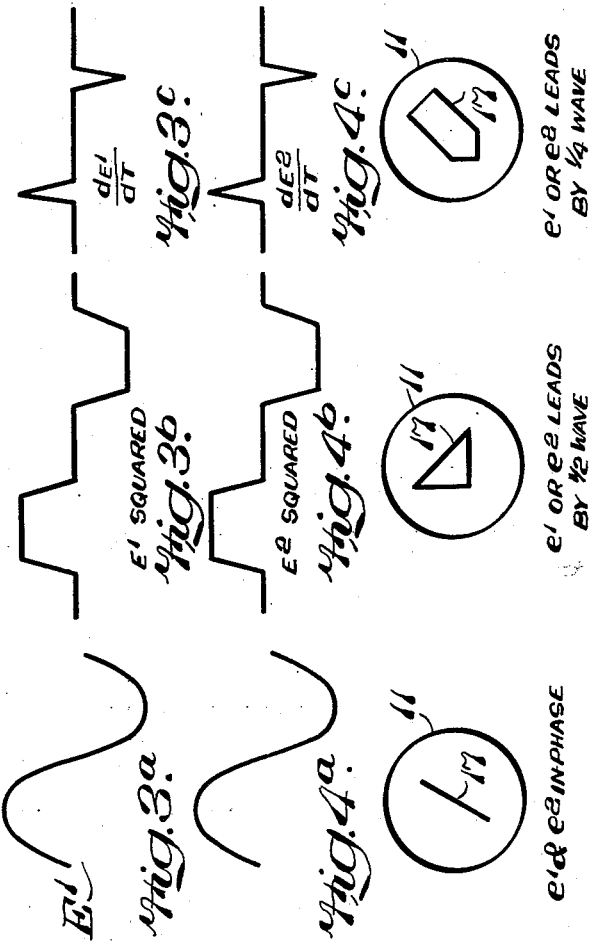
Inventor
THEODORE A. SMITH
HAROLD J. SCHRADER
By
Attorney Patented June 1, 1943

2,320,476

UNITED STATES PATENT OFFICE 2,320,476

PHASE MEASUREMENT

Harold J. Schrader, Haddon Heights, N. J., and Theodore A. Smith, Philadelphia, Pa., assignors to Radio Corporation of America, a corporation of Delaware Application September 30, 1941, Serial No. 413,072

7 Claims. (Cl. 172—245)

This invention relates to phase measurement, and more particularly to a method of and apparatus for determining the phase relation between two alternating voltages, the primary object of our invention being to provide an improved method of and means for accurately indicating when two alternating voltages are exactly in phase.

According to our invention, the two voltages of which the phase relationship is to be indicated are first squared by any suitable means, such as a clipping circuit, then differentiated, and then the voltage pulses so obtained are applied to two different sets of deflecting plates of a cathode ray oscillograph. The two differentiated voltages may, if desired, first be rectified to eliminate either the positive or negative peaks before being connected to the deflecting plates, thereby simplifying the oscillograph pattern. The accuracy of the indication is controlled mainly by the steepness of the sides of the square waves produced and the degree to which the differentiated voltages are true.

The novel features that we consider characteristic of our invention are set forth with particularity in the appended claims. The invention itself, however, both as to its organization and method of operation, together with additional objects and advantages thereof, will best be understood from the following description of one embodiment thereof, when read in connection with the accompanying drawing, in which Figure 1 is a schematic diagram showing one form of our invention, Figure 2a is a curve showing the original form of one of the two voltages being compared, Figure 2b shows the form of the voltage after being clipped, Figure 2c shows the form of the voltage after being differentiated, Figure 2d shows the differentiated voltage of Fig. 2c after rectification, Figures 3a, 3b, 3c and 4d correspond to Figs. 2a, 2b, 2c and 2d, respectively, but relate to the other of the two voltages being compared, Figures 4a, 4b, 4c and 4d show various patterns corresponding to different phase relations between the voltages of which the phase relationship is being determined.

Referring more particularly to the drawing, there is shown, in Fig. 1, a pair of channels 1 and 3 the former of which is supplied with an alternating voltage $E_1$, such as a sinusoidal voltage, and the latter of which is supplied with an alternating sinusoidal voltage $E_2$ of the same frequency as the voltage $E_1$ or of a harmonic thereof. The voltage $E_1$, in the form shown in Fig. 2a, for example, is supplied to an amplifier 2 in the channel 1, the output of the amplifier 2 being fed to a suitable clipping circuit 4 which may square the wave into the form shown in Fig. 2b. The output from the squaring circuit 4 is supplied to a suitable differentiating circuit 6 which forms the narrow voltage pulses shown in Fig. 2c. The output of the differentiating circuit 6 may, if desired, be rectified by a suitable rectifier 8 to provide the narrow rectified pulses $e_1$ shown in Fig. 2d, and these pulses are supplied to one set of deflecting plates 7 (for example, the vertical deflecting plates) of a cathode ray tube 9 having a screen 11. The voltage $E_2$, as shown in Fig. 3a, is supplied to an amplified 10 in the channel 3, and the output of the amplifier 2 is fed to a suitable clipping circuit 12 similar to the clipping circuit 4 for squaring the wave, as shown in Fig. 3b. The output of the clipping circuit 12 is supplied to a differentiating circuit 14 which forms the narrow voltage pulses shown in Fig. 3c at precisely the same instant as the pulses shown in Fig. 2c, and thence to a rectifier 16 which rectifies the alternating pulses of Fig. 3c to provide the narrow pulses $e_2$ shown in Fig. 2d, the latter pulses being supplied to a second pair of deflecting plates 13 of the tube 9. The plates 13 are effective in a direction substantially normal to the direction in which the deflecting plates 7 are effective (for example, in a horizontal direction) to deflect an electron beam 15 emitted by the cathode 18 of the tube 9. The combined effects of the deflecting plates 7—7 and 13—13 will be to displace the electron beam 15 from its normal path to trace a pattern 17 on the screen 11, and by observing the pattern 17, the phase relation between the two voltages $E_1$ and $E_2$ may be quickly and accurately determined.

Any suitable amplifiers, clipping circuits, differentiating circuits and rectifiers may be employed in carrying out our invention. Since these are not, per se, a part of our invention, it is not deemed necessary to describe them in greater detail. However, reference is made to the U. S. patent to Smith No. 2,132,655, granted October 11, 1938, which shows various amplifying, clipping, differentiating and rectifying circuits which are suitable and which may be employed in accordance with our invention.

Fig. 4a shows the pattern traced by the electron beam 15 when the voltage pulses $e_1$ and $e_2$ are exactly in phase. This pattern, it will be noted, is a straight line. When either the pulse $e_1$ or $e_2$ leads the other by a half wave, the pattern 17 will appear as a triangle, as shown in Fig. 4b. When either of the pulses $e_1$ or $e_2$ leads the other by only a quarter wave length, the pattern 17 will appear as a relatively wide pentagon, such as shown in Fig. 4c, while if either one of the voltage pulses $e_1$ or $e_2$ leads the other by only one-eighth wave length, the pattern 17 will appear as a narrower pentagon, such as shown in Fig. 4d, the pentagon gradually approaching a straight line as the voltage pulses $e_1$ and $e_2$ approach each other in phase. Thus, by observing the pattern 17, the phase relation between the voltages $E_1$ and $E_2$ may be readily determined.

From the foregoing description, it will be apparent to those skilled in the art, that we have provided a very accurate method of readily determining the phase relation between two alternating voltages both of which have either the same frequency or frequencies which are harmonics of one another. Although we have shown and described one embodiment of our invention, it will be apparent to those skilled in the art that other modifications are possible. We therefore desire that our invention shall not be limited except insofar as is made necessary by the prior art and by the spirit of the appended claims.

We claim as our invention:

1. The method of determining the phase relation between a pair of alternating voltages of the same or harmonic frequencies with the aid of a cathode ray tube having electron beam deflecting means effective in two directions substantially normal to each other which comprises separately deriving from each of said alternating voltages other voltages having predetermined characteristics, causing one of said last-named voltages to deflect said electron beam in one of said directions, and simultaneously causing the other of said last-named voltages to deflect said electron beam in the other of said directions whereby said deflected beam will trace a pattern on the screen of said tube indicative of the phase relation between said alternating voltages.

2. The method of determining the phase relation between a pair of alternating voltages of the same or harmonic frequencies with the aid of a cathode ray tube having electron beam deflecting means effective in two directions substantially normal to each other which comprises separately deriving predetermined voltage impulses from each of said alternating voltages, and causing the voltage impulses so derived to deflect said electron beam from its normal path whereby said deflecting beam will trace a pattern on the screen of said tube indicative of the phase relation between said alternating voltages.

3. The method of determining the phase relation between a pair of alternating voltages of the same or harmonic frequencies with the aid of a cathode ray tube having electron beam deflecting means effective in two directions substantially normal to each other which comprises separately deriving predetermined voltage impulses from each of said alternating voltages, causing the voltage impulses derived from one of said alternating voltages to deflect said electron beam in one of said directions, and simultaneously causing the voltage impulses derived from the other of said alternating voltages to deflect said electron beam in the other of said directions whereby said deflected beam will trace a pattern on the screen of said tube indicative of the phase relation between said alternating voltages.

4. The method of determining the phase relation between a pair of alternating voltages of the same or harmonic frequencies with the aid of a cathode ray tube having electron beam deflecting means effective in two directions substantially normal to each other which comprises deriving from one of said alternating voltages a series of pulses occurring in predetermined time relation thereto, deriving from said other alternating voltage a series of pulses occurring in a predetermined time relation with respect to said other alternating voltage, causing said first-named pulses to deflect said electron beam in one of said directions, and simultaneously causing the other of said pulses to deflect said electron beam in the other of said directions whereby said deflected beam will trace a path on the screen of said tube indicative of the phase relation between said alternating voltages.

5. The method of determining the phase relation between a pair of alternating voltages of the same or harmonic frequencies with the aid of a cathode ray tube having electron beam deflecting means effective in two directions substantially normal to each other which comprises deriving frome one of said voltages a series of comparatively narrow voltage pulses occurring in predetermined time relation thereto, simultaneously deriving from said other alternating voltage a series of similar pulses occurring in the same time relation with respect to said other alternating voltage, causing said first-named pulses to deflect said electron beam in one of said directions, and simultaneously causing the other of said pulses to deflect said electron beam in the other of said directions whereby said deflected beam will trace a path on the screen of said tube indicative of the phase relation between said alternating voltages.

6. The method of determining the phase relation between a pair of alternating sinusoidal voltages of the same or harmonic frequencies with the aid of a cathode ray tube having electron beam deflecting means effective in two directions substantially normal to each other which comprises separately first clipping each of said voltages to obtain alternating voltages of substantially square wave form, then differentiating each of said squared voltages to obtain two sets of voltage pulses having a predetermined time relation to each of said sinusoidal voltages, then rectifying said pulses to obtain only half cycles thereof, and finally causing one set of said rectified pulses to effect displacement of said electron beam in one of said directions while simultaneously causing the other of said sets of rectified pulses to effect displacement of said electron beam in the other of said directions whereby said deflected beam will trace a path on the screen of said tube indicative of the phase relation between said sinusoidal voltages.

7. In apparatus for indicating the phase relation between a pair of alternating voltages, means providing one channel for deriving narrow voltage impulses from one of said alternating voltages, means providing a second channel for deriving narrow voltage impulses from the other of said alternating voltages, a cathode ray tube including an electron-sensitive screen, means within said tube providing and directing an electron beam onto said screen, and means coupled to the outputs of said channels for causing said beam to be deflected in accordance with said voltage impulses to trace a pattern on said screen indicative of the phase relation between said alternating voltages.

HAROLD J. SCHRADER.
THEODORE A. SMITH.